Nov. 27, 1951 R. R. McCRUMB 2,576,304
WEEDLESS FISHHOOK
Filed Sept. 29, 1949 2 SHEETS—SHEET 1

INVENTOR.
RAY R. McCRUMB
BY Samuel H. Davis
ATTORNEY

Nov. 27, 1951  R. R. McCRUMB  2,576,304
WEEDLESS FISHHOOK

Filed Sept. 29, 1949  2 SHEETS—SHEET 2

INVENTOR.
RAY R. McCRUMB
BY *Samuel H. Davis*
ATTORNEY

Patented Nov. 27, 1951

2,576,304

UNITED STATES PATENT OFFICE 2,576,304

WEEDLESS FISHHOOK

Ray R. McCrumb, Lansing, Mich.

Application September 29, 1949, Serial No. 118,490

1 Claim. (Cl. 43—35)

This invention relates to fish hooks, is particularly concerned with fish hooks in combination with plugs, and is more particularly concerned with a weedless fish hook.

The art of casting or trolling for fish is most frequently done in waters having a substantial amount of vegetation growing on the bottom, and very frequently in dams where there are logs and tree stumps. The common practice heretofore has been with open hooks attached to some form of lure to which some type of fish are attracted. By the use of open hooks, especially in waters having a great deal of vegetation there is a tendency for the hook to become snagged in the vegetation or on logs and be lost. Although there are a number of devices presently used to prevent the hook from becoming snagged, none of these devices are entirely satisfactory.

It is therefore an object of the present invention to provide a fish hook. It is a further object to provide a weedless fish hook. It is still a further object of the present invention to provide a weedless fish hook whereby the same may be used in waters having a considerable amount of vegetation or logs with substantially no possibility of the hook becoming snagged. It is still a further object to provide a weedless fish hook which is of simple construction and having great economy of manufacture.

While some of the more outstanding features and advantages of this invention have been hereinbefore indicated, others will become apparent from the following disclosures, taken in conjunction with the accompanying drawing, in which.

Figure 1:
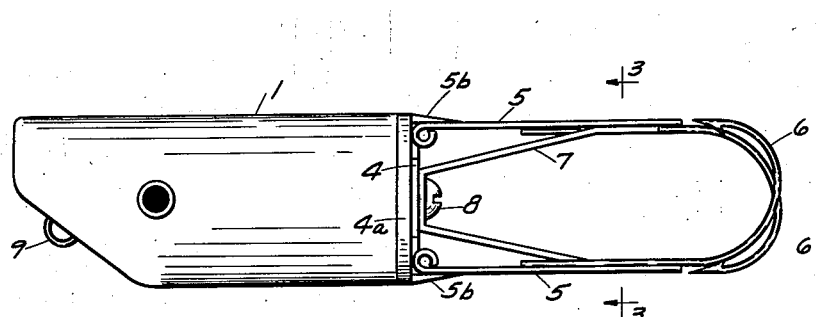
Fig. 1 is a side elevation of a plug with the present invention secured thereto.

Fig. 1 shows a side elevation of a plug with the present fish hook assembly secured to it. The plug 1 has an eyelet 9 attached to it and this is for attaching a fish line to the plug. The weedless fish hooks are secured to the rear end of the plug by first securing to this end of the plug a back stop plate 4a. The vertical leaf 4 of a pair of hinges is attached to the plug through the back stop plate 4a and to the rear of the plug. The attachment of the leaf 4 is accomplished by means of the round head screw 8. The screw 8 also secures the V-shaped flat spring 7 to the plug. The hinges referred to above comprise the vertical leaf 4, and the two horizontal leaves 5. Each leaf 5 is welded to a hook 6. There are two stop bars 5b which are welded to the back stop plate 4a. The stop bars 5b serve in maintaining the two hooks in the proper position, in one direction, that is, away from each other, and the flat spring 7 serves in maintaining the two hooks in the proper position in the other direction.

Figure 3:
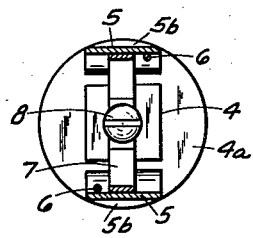
Fig. 3 is a section of the plug shown in Fig. 1 and taken along the lines 3—3 thereof.
Figure 2:
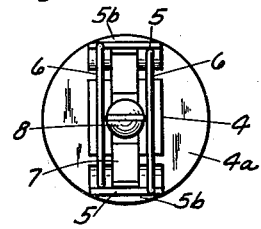
Fig. 2 is an end view of the same shown in Fig. 1, as seen from the rear of the plug.
Figure 8:
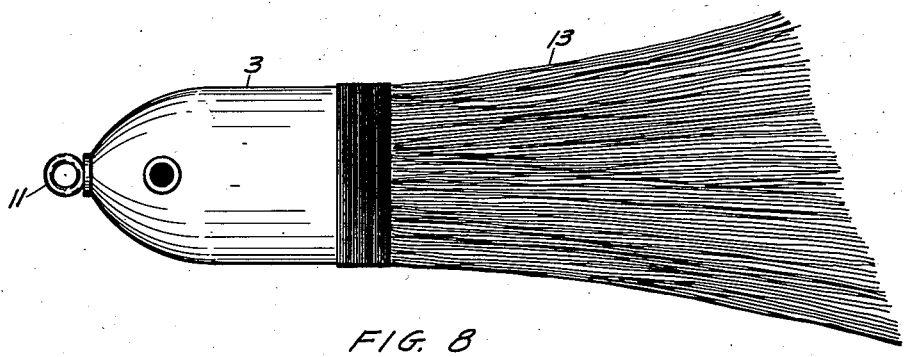
Fig. 8 is a side view of the plug shown in Fig. 6 with deer hair attached to disguise the same.

Fig. 3 shows a plug and a means for attachment to the present fish hook assembly. It will be noted that the shank 12 extends from the ring 11 through the plug 3 and the back stop plate 4a with the remainder of the fish hook assembly being secured to the plug 3 by means of the said shank. Fig. 8 shows an identical device as shown in Fig. 6 but the hooks are covered with a blind made of deer hair 13.

Figure 4:
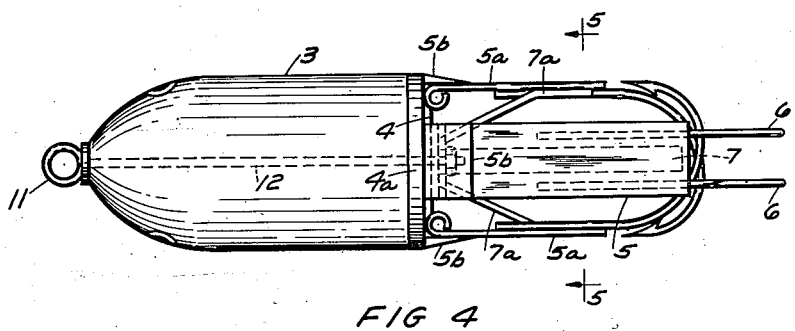
Fig. 4 is a top view of the plug.
Figure 5:
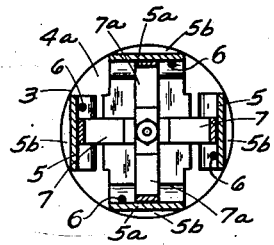
Fig. 5 is a section of the plug taken along the lines 5—5 of Fig. 4.
Figure 6:
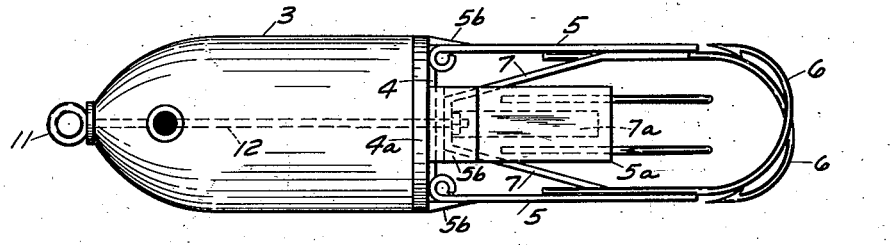
Fig. 6 is a side elevation of the plug with the present fish hook assembly secured thereto.
Figure 7:
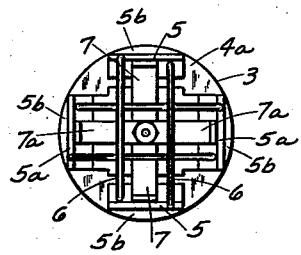
Fig. 7 is an end view of the plug shown in Fig. 6, looking at the rear of the plug.

It will be noted that in the modified form of my invention shown in the Figs. 4 and 6, there are two pairs of hooks. Each pair of hooks is movable in planes perpendicular to the planes of movement of the other pair of hooks. The modified form of my invention permits the hooking of a fish in either plane whereas in the form of my invention shown in the Fig. 1 the hooks are movable in only one plane and it becomes necessary that the jaws of the fish be perpendicular to the plane of the two hooks before a perfect catch can be obtained.

I wish particularly to point out that the hooks of my invention can be trolled in weeds, in the presence of logs, roots, and stumps without becoming snagged.

Having clearly set forth the construction, utility and advantages of my invention I wish particularly to state that it will be apparent that changes in the details of the construction and arrangement of the various members of the invention may be resorted to without departing from the spirit and scope of the invention as hereinafter claimed.

I claim:

A fish lure including a plug body having line attaching means at its front end and a flat rear end, a back stop plate secured to the rear end of said plug body, opposed rearwardly extending stop bars secured to said back stop plate, interconnected hinges having opposed leaves mounted on said back stop plate engageable with said stop bars, opposed overlapping hooks having shanks secured to said hinge leaves, interconnected spring members mounted on said stop plate in superposed position on the interconnecting portions of said hinges and engageable with said leaves for normally and resiliently holding the same in engagement with said stop bars, and a common means for securing said back stop plate, the interconnecting portions of said hinges, and spring members to the flat rear end of said plug body.

RAY R. McCRUMB.

REFERENCES CITED

The following references are of record in the file of this patent:

UNITED STATES PATENTS

| Number | Name | Date |
|---|---|---|
| 1,920,991 | Lahm | Aug. 8, 1933 |
| 1,959,911 | Fogelson | May 22, 1934 |
| 2,200,670 | Hargrett | May 14, 1940 |
| 2,396,366 | Forbess | Mar. 12, 1946 |
| 2,436,232 | Shetka | Feb. 17, 1948 |